United States Patent
Goan

(10) Patent No.: US 7,976,948 B2
(45) Date of Patent: *Jul. 12, 2011

(54) NANOSIZED PHOSPHOR

(75) Inventor: Kazuyoshi Goan, Kanagawa (JP)

(73) Assignee: Konica Minolta Medical & Graphic, Inc. (JP)

( * ) Notice: Subject to any disclaimer, the term of this patent is extended or adjusted under 35 U.S.C. 154(b) by 535 days.

This patent is subject to a terminal disclaimer.

(21) Appl. No.: 12/089,061

(22) PCT Filed: Sep. 22, 2006

(86) PCT No.: PCT/JP2006/318820
§ 371 (c)(1),
(2), (4) Date: Apr. 3, 2008

(87) PCT Pub. No.: WO2007/040063
PCT Pub. Date: Apr. 12, 2007

(65) Prior Publication Data
US 2009/0169889 A1  Jul. 2, 2009

(30) Foreign Application Priority Data
Oct. 6, 2005  (JP) .................. 2005-293379

(51) Int. Cl.
*B32B 5/16* (2006.01)
(52) U.S. Cl. ............ 428/402; 252/301.6 P; 252/301.4 P
(58) Field of Classification Search .................. 428/402; 252/301.6 P, 301.4 P
See application file for complete search history.

(56) References Cited

U.S. PATENT DOCUMENTS

| | | | | |
|---|---|---|---|---|
| 6,576,156 | B1 * | 6/2003 | Ratna et al. | 252/301.4 R |
| 7,303,697 | B2 * | 12/2007 | Isobe | 252/301.6 F |
| 7,399,430 | B2 * | 7/2008 | Goan | 252/301.4 R |
| 7,452,485 | B2 * | 11/2008 | Hoshino et al. | 252/301.6 F |
| 7,687,816 | B2 * | 3/2010 | Dias | 257/98 |
| 7,709,103 | B2 * | 5/2010 | Saito | 428/690 |

FOREIGN PATENT DOCUMENTS

| | | |
|---|---|---|
| JP | 9-291273 | 11/1997 |
| JP | 2003-88743 | 3/2003 |
| JP | 2004-323576 | 11/2004 |
| JP | 2005-68326 | 3/2005 |
| WO | W02005-087894 | 9/2005 |
| WO | W02005-123874 | 12/2005 |

OTHER PUBLICATIONS

International Search Report for International Application No. PCT/JP2006/318820 mailed Oct. 24, 2006.

* cited by examiner

*Primary Examiner* — Leszek Kiliman
(74) *Attorney, Agent, or Firm* — Cantor Colburn LLP

(57) ABSTRACT

The present invention is to provide a nanosized phosphor exhibiting enhanced luminance as a molecular labeling phosphor by controlling an electrostatic charge of an inorganic phosphor. The nanosized phosphor is featured in that at least 90% of total particles have a particle size of 1 to 100 nm and an electrostatic charge of the total particles is in the range of −20 μC/g to 5 μC/g.

5 Claims, 1 Drawing Sheet

NANOSIZED PHOSPHOR

CROSS REFERENCE TO RELATED APPLICATIONS

This is a U.S. national stage of application No. PCT/JP2006/318820, filed on 22 Sep. 2006. Priority under 35 U.S.C. §119(a) and 35 U.S.C. §365(b) is claimed from Japanese Application No. 2005-293379, filed 6 Oct. 2005, the disclosure of which is also incorporated herein by reference.

TECHNICAL FIELD

The present invention relates to nanosized phosphor used for displays.

TECHNICAL BACKGROUND

In the field of biotechnology, there has been known a method in which using an antibody labeled with an organic phosphor, a phosphorescence emitted upon exposure to ultraviolet rays is measured by an optical microscope or a photodetector; in fact, however, such a method exhibits low sensitivity and is rarely applicable for quantitative measurements. This is due to the fact that an organic phosphor exhibits a low emission efficiency and is also destroyed upon exposure to electron beams.

On the contrary, inorganic phosphors are stable and rarely deteriorate upon exposure to ultraviolet rays or electron beams. Inorganic phosphors are practically used for displays and lamps but these phosphors, which are generally not less than 1 µm in their particle size, are not practical for use as a phosphor for molecular labeling.

An inorganic phosphor used for a phosphor for molecular labeling requires not only reduced particle size but also adsorption or bonding of molecular-labeling substances such as proteins or DNA is also required. Surface physical properties of an inorganic phosphor vary adsorbability or bonding capability. To control surface physical properties, there were proposed methods for surface coverage (as described in, for example, Patent document 1), but produced problems such that a surface-covering compound inhibited adsorption or bonding of a molecular-labeling substance, or the surface-covering compound absorbing excitation light resulted in reduced emission efficiency.

Patent document 1: JP-A No. 9-291273 (hereinafter, the term PP-A refers to Japanese Patent Application Publication)

DISCLOSURE OF THE INVENTION

Problem to be Solved

The present invention has come into being in view of the foregoing problems, and it is an object of the invention to provide a nanosized phosphor exhibiting enhanced luminance as a molecular labeling phosphor by controlling an electrostatic charge of an inorganic phosphor.

Means for Solving the Problems

The object of the invention can be realized by the following constitution.

1. A nanosized phosphor, wherein at least 90% of total particles have a particle size of 1 to 100 nm and an electrostatic charge amount of the particles is from −20 µC/g to 5 µC/g.

2. The nanosized phosphor as described in 1, wherein the nanosized phosphor meets a requirement of σ/r being from 0.05 to 0.5 in which r is an average particle size of the nanosized phosphor and σ is a standard deviation of particle size distribution of the nanosized phosphor.

Effect of the Invention

The nanosized phosphor exhibits enhanced luminance as a molecular-labeling phosphor, resulting in a superior effect.

PREFERRED EMBODIMENTS OF THE INVENTION

Figure 1:
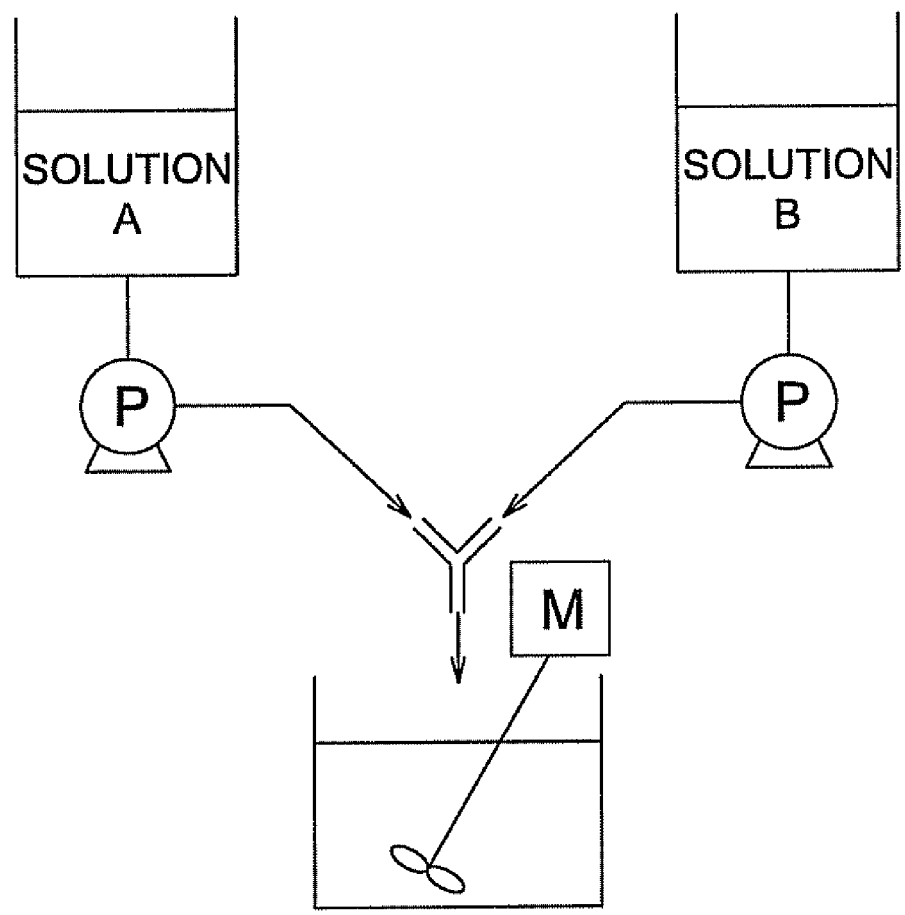
FIG. 1 illustrates an example of a Y-shaped reactor usable in the invention.

Hereinafter, the invention will be further described in detail.

The invention is featured in that at least 90% of total particles have a particle size of 1 to 100 nm.

Preferably, at least 95% of the total particles have a particle size of not more than 100 nm and more preferably, the total particles have a particle size of not more than 80 nm. The particle size refers to the length of an edge of the particle when the particle is a regular crystal such as a cubic or octahedral crystal and when the particle is not a regular crystal but is, for example, a spherical, bar-like or tabular form, it refers to the diameter of a sphere equivalent to the particle volume.

In the invention, when the average particle size of a phosphor is denoted as "r" and the standard deviation of particle size distribution is denoted as "σ", σ/r is not more than 0.5, preferably not more than 0.4, and more preferably not more than 0.3. The lower limit thereof is 0.05.

The electrostatic charge amount of phosphor particles is not less than −20 µC/g and not more than 5 µC/g, preferably not less than −10 µC/g and not more than 5 µC/g, and more preferably not less than −5 µC/g and not more than 5 µC/g.

Phosphor Composition (Specific Example of Compound)

Specific examples of a compound of an inorganic phosphor usable as a phosphor of the invention are shown below but are by no means limited to these.

Blue-Emitting Phosphor Compound
  (BL-1): $Sr_2P_2O_7:Sn^{4+}$
  (BL-2): $Sr_4Al_{14}O_{25}:Eu^{2+}$
  (BL-3): $BaMgAl_{10}O_{17}:Eu^{2+}$
  (BL-4): $SrGa_2S_4:Ce^{3+}$
  (BL-5): $CaGa_2S_4:Ce^{3+}$
  (BL-6): $(Ba,Sr)(Mg,Mn)Al_{10}O_{17}:Eu^{2+}$
  (BL-7): $(Sr,Ca,Ba,Mg)_{10}(PO_4)6Cl_2:Eu^{2+}$
  (BL-8): $ZnS:Ag$
  (BL-9): $CaWO_4$
  (BL-10): $Y_2SiO_5:Ce$
  (BL-11): $ZnS:Ag,Ga,Cl$
  (BL-12): $Ca_2B_5O_9Cl:Eu^{2+}$
  (BL-13): $BaMgAl_{14}O_{23}:Eu^{2+}$
  (BL-14): $BaMgAl_{10}O_{17}:Eu^{2+},Tb^{3+},Sm^{2+}$
  (BL-15): $BaMgAl_{14}O_{23}:Sm^{2+}$
  (BL-16): $Ba_2Mg_2Al_{12}O_{22}:Eu^{2+}$
  (BL-17): $Ba_2Mg_4Al_8O_{18}:Eu^{2+}$
  (BL-18): $Ba_3Mg_5Al_{18}O_{35}:Eu^{2+}$
  (BL-19): $(Ba,Sr,Ca)(Mg,Zn,Mn)Al_{10}O_{17}:Eu^{2+}$ Green-Emitting Phosphor Compound:
- (GL-1): $(Ba,Mg)Al_{16}O_{27}:Eu^{2+},Mn^{2+}$
- (GL-2): $Sr_4Al_{14}O_{25}:Eu^{2+}$
- (GL-3): $(Sr,Ba)Al_2Si_2O_8:Eu^{2+}$
- (GL-4): $(Ba,Mg)_2SiO_4:Eu^{2+}$
- (GL-5): $Y_2SiO_5:Ce^{3+},Tb^{3+}$
- (GL-6): $Sr_2P_2O_7-Sr_2B_2O_5:Eu^{2+}$
- (GL-7): $(Ba,Ca,Mg)_5(PO_4)_3Cl:Eu^{2+}$
- (GL-8): $Sr_2Si_3O_8\text{-}2SrCl_2:Eu^{2+}$
- (GL-9): $Zr_2SiO_4,MgAl_{11}O_{19}:Ce^{3+},Tb^{3+}$
- (GL-10): $Ba_2SiO_4:Eu^{2+}$
- (GL-11): ZnS:Cu,Al
- (GL-12): (Zn,Cd)S:Cu,Al
- (GL-13): ZnS:Cu,Au,Al
- (GL-14): $Zn_2SiO_4:Mn^{2+}$
- (GL-15): ZnS:Ag,Cu
- (GL-16): (Zn,Cd)S:Cu
- (GL-17): ZnS:Cu
- (GL-18): $Gd_2O_2S:Tb$
- (GL-19): $La_2O_2S:Tb$
- (GL-20): $Y_2SiO_5:Ce,Tb$
- (GL-21): $Zn_2GeO_4:Mn$
- (GL-22): $CeMgAl_{11}O_{19}:Tb$
- (GL-23) $SrGa_2S_4:Eu^{2+}$
- (GL-24): ZnS:Cu,Co
- (GL-25): $MgO.nB_2O_3:Ce,Tb$
- (GL-26): LaOBr:Tb,Tm
- (GL-27): $La_2O_2S:Tb$
- (GL-28) $SrGa_2S_4:Eu^{2+},Tb^{3+},Sm^{2+}$ Red-Emitting Phosphor Compound:
- (RL-1): $Y_2O_2S:Eu^{3+}$
- (RL-2): $(Ba,Mg)_2SiO_4:Eu^{3+}$
- (RL-3): $Ca_2Y_8(SiO_4)_6O_2:Eu^{3+}$
- (RL-4): $LiY_9(SiO_4)_6O_2:Eu^{3+}$
- (RL-5): $(Ba,Mg)Al_{16}O_{27}:Eu^{3+}$
- (RL-6): $(Ba,Ca,Mg)_5(PO_4)_3Cl:Eu^{3+}$
- (RL-7): $YVO_4:Eu^{3+}$
- (RL-8) $YVO_4:Eu^{3+},Bi^{3+}$
- (RL-9): $CaS:Eu^{3+}$
- (RL-10): $Y_2O_3:Eu^{3+}$
- (RL-11): $3.5MgO,0.5MgF_2GeO_2:Mn$
- (RL-12): $YAlO_3:Eu^{3+}$
- (RL-13): $YBO_3:Eu^{3+}$
- (RL-14): $(Y,Gd)BO_3:Eu^{3+}$ Precursor Formation Step:

Next, there will be described a method of preparing the phosphor relating to the invention. The method of preparing a vacuum ultraviolet ray-exciting phosphor relating to the invention comprises a precursor formation step of forming a precursor of a phosphor, a calcination step of calcining the precursor obtained in the precursor formation step to obtain phosphor particles and an etching step of subjecting the surface of the phosphor particles obtained in the calcination step to remove impurities.

First, the precursor formation step will be described. The precursor formation step relating to the invention may employ any method but it is preferred to synthesize a precursor through a liquid phase method (which is also called a liquid phase synthesis method). The precursor refers to an intermediate product of a phosphor and in the calcination step, as described later, the precursor is calcined at a prescribed temperature to obtain phosphor particles.

The liquid phase method refers to a method of preparing (synthesizing) a precursor in the presence of a liquid or in a liquid. In the liquid phase method, phosphor raw materials are allowed to react in a liquid phase so that a reaction between element ions constituting a phosphor is performed, rendering it easy to obtain stoichiometrically high-pure phosphor. As compared to a solid phase method of preparing a phosphor with repeating a solid phase reaction and a pulverizing operation step, fine particles can be obtained without performing such a pulverizing operation and lattice defects within crystals, caused by stress applied during pulverization can be inhibited, preventing reduction of emission efficiency.

Liquid phase methods usable in the embodiments include a conventional crystallization process, as typified by cooling crystallization and a sol-gel process, but a reaction crystallization process is specifically preferred.

The preparation method of an inorganic phosphor precursor by a sol-gel process refers to a preparation method in which a metal alkoxide such as $Si(OCH_3)_4$ or $Eu^{3+}(CH_3COCHCOCH_3)_3$, a metal complex such as $Mg[Al(OC_4H_9)_3]_2$ prepared by adding a metallic magnesium to a 2-butanol solution of $Al(OC_4H_9)_3$, a double alkoxide prepared by adding a metal as a single substance to such a metal complex, a metal halide, a metal salt of an organic acid, or a metal as a single substance is used as a parent material, an activator or a co-activator, and these materials are mixed at requisite amounts and thermally or chemically polycondensated.

The preparation method of an inorganic phosphor precursor by a reaction crystallization process refers to a method of preparing a precursor by mixing a solution or a raw material gas containing elements forming a phosphor in a liquid or gas phase through employing a crystallization phenomenon. The crystallization phenomenon refers to one in which a solid phase is crystallized from a gas phase when the state of a mixing system is varied through a physical or chemical environmental change, such as cooling, vaporization, pH controlling or condensation, or a chemical reaction. The reaction crystallization process means a preparation method by a physical or chemical operation due to occurrence of such a crystallization phenomenon.

Any solvent in which reaction raw materials are soluble is usable in the reaction crystallization process but water is preferred in terms of easy control of supersaturation. Plural reaction raw materials may be added at the same time or at different times, which can appropriately be chosen according to the activity of the materials.

In the precursor formation, at least two raw material solutions are preferably added, through submerged addition, into a poor solvent in the presence of a protective colloid, whereby phosphor particles falling within the narrow particle size range are produced. It is also preferred to control reaction conditions such as temperature, addition rate, stirring speed, pH and the like, depending on the kind of a phosphor. The reaction may be subjected to ultrasonic. There may also be added a surfactant or a polymer to control the particle size. It is also a preferred embodiment that after completing addition of raw materials, the reaction solution is optionally concentrated or ripened.

Protective colloids, which function to prevent aggregation of precursor particles, can employ various kinds of polymeric compounds including natural and synthetic ones. Of these, the use of proteins is preferred.

Examples of proteins include gelatin, a water-soluble protein and a water-soluble glycoprotein. Specific examples include albumin, egg albumin, casein, soy bean protein, synthetic proteins and genetically-modified proteins.

Gelatins include, for example, a lime-treated gelatin and an acid-treated gelatin. These gelatins may be used in combination. There may also used a hydrolysis or enzymolysis product of a gelatin.

A protective colloid need not be formed of a single constituent but various kinds of binders may be combined. Specifically, for example, there may be used a graft polymer of a gelatin with other polymer.

The average molecular eight of a protective colloid is preferably not less than 10,000, more preferably 10,000 to 300,000, and still more preferably 10,000 to 30,000. A protective colloid may be added to at least one of the raw material solutions or all of the raw material solutions. The particle size of a precursor can be controlled by an addition amount of a protective colloid or by the addition rate of a reaction solution.

Phosphor characteristics, for example, particle size, particle size distribution or luminescence characteristics of calcined phosphor particles are greatly affected by the properties of a precursor of the phosphor, so that it is preferred to control the phosphor particle size, resulting in reduced particle size. Reduction of the precursor particle size tends to cause aggregation of precursor particles so that addition of a protective colloid to prevent aggregation of precursor particles is extremely effective for precursor synthesis, whereby the particle size can be easily controlled. When performing a reaction in the presence of a protective colloid, it is necessary to take sufficient account of control of precursor particle size distribution or removal of impurities such as by-product salts.

In the process of forming a precursor, after synthesis of the precursor with controlling particle size, the precursor is recovered by centrifugal separation or the like and then preferably subjected to a washing or desalting treatment.

The desalting treatment is a step to remove impurities such as by-product salts, for which various methods are applicable, including, for example, a membrane separation method, a coagulation method, an electrodialysis method, a method of using an ion-exchange resin, a noodle washing method and a method of using an ultrafiltration membrane.

The desalting treatment may be conducted immediately after completing the formation of a precursor or may be repeated plural times according to the reaction condition of the raw materials.

After completion of dehydration and desalting, a drying step is conducted. The drying step is conducted preferably after washing or desalting and can be done by any method such as vacuum drying, flash drying, fluidized-bed drying and spray drying. The drying temperature is not specifically limited but preferably is higher than the temperature at which the used solvent is vaporized. An excessively high drying temperature performs calcination simultaneously with drying, resulting in formation of a phosphor without performing the subsequent calcination treatment. Specifically, the drying temperature is preferably in the range of 50 to 300° C. and more preferably in the range of 100 to 200° C.

Calcination Step:

The calcination step may be conducted by any appropriate method and the calcination temperature or time may optimally be controlled with the range of the invention. For example, a precursor is filled within an alumina boat and calcined in a prescribed gas atmosphere at a prescribed temperature to obtain a desired phosphor.

The calcination device (calcination vessel) may be any one presently known. For example, a box type furnace, a crucible pot, a columnar tube type, a boat type, a rotary kiln and a spray calcination device are preferably employed.

An anti-sintering agent may be added at the time of calcination but may not be added when there is no need for such addition. An anti-sintering agent may be added in the form of a slurry at the time of forming the precursor; alternatively, a mixture of a powdery anti-sintering agent and a dried precursor may be calcined.

Anti-sintering agents are not specifically limited but are appropriately chosen according to the kind of phosphor or calcination condition. According to the calcination temperature range, for a phosphor, a metal oxides such as $TiO_2$ at a calcination of not higher than 800° C., $SiO_2$ at a calcination of not higher than 1000° C. and $Al_2O_3$ at a calcination of not higher 1700° C. are preferably used, respectively.

Further, a reduction treatment or an oxidation treatment may optionally be conducted after completion of calcination. After calcination, there may be conducted a cooling treatment, a surface treatment or a dispersing treatment, or classification may be performed.

The cooling treatment is a treatment for cooling the calcined material obtained in the calcination step and the calcined material may be cooled while being fed into the calcination device.

The cooling treatment is not specifically limited but can be chosen from commonly known cooling methods. For instance, the temperature may be lowered while being allowed to stand or may be forcedly cooled by a cooling machine, while controlling a temperature.

Surface Treatment:

The phosphor prepared in the invention can be subjected to a surface treatment such as adsorption or coverage for various purposes. The time to be subjected to a surface treatment depends on the purpose and appropriate selection results in enhanced effects. For instance, coverage of the phosphor surface with an oxide containing at least one element selected from Si, Ti, Al, Zr, Zn, In, and Sn at any time prior to the dispersion treatment inhibits reduction of crystallinity of the phosphor which is caused during the dispersion treatment and prevents from being trapped by surface defects of the phosphor, leading to minimized reduction of emission intensity. Further, coverage of the phosphor surface with an organic polymer compound at any time after the dispersing treatment results in enhanced characteristics such as weather resistance, leading to a phosphor of enhanced durability. When subjecting the surface treatment, the thickness or coverage rate of a coverage layer can be optimally or arbitrarily controlled.

Dispersion Treatment:

Hereinafter, there will be described a dispersion treatment. In the invention, phosphor particles obtained in the calcination step are preferably subjected to the dispersion treatment, as described below.

Methods for a dispersion treatment include, for example, a high-speed stirring impeller type dispersing machine, a colloid mill, a roller mill, and those which allow the media material to move within the treatment device to perform microparticulation via both crushing and shearing force such as a ball mill, a vibration mill, an atriter, a planetary ball mill and a sand mill, a dry dispersing machine such as a cutter mill, a hammer mill or a jet mill, an ultrasonic dispersing machine and a high-pressure homogenizer.

Of these, it is preferred to employ a wet media type dispersing machine using media in the invention and a continuous wet media type dispersing machine capable of performing continuous dispersion is specifically preferred. A process of connecting plural continuous wet media type dispersing machines in series is also applicable. The expression, capable of performing continuous dispersion refers to such an embodiment of dispersing at least a phosphor and a dispersing medium with supplying them into a dispersing machine at a constant quantity per time without interruption, and concurrently ejecting the dispersed material produced in the foregoing dispersing machine, without interruption, from the machine in the mode of being pushed out by supply. In cases when employing a wet media type dispersing machine using media at the dispersion treatment step in the process of preparing a phosphor, a vertical or horizontal dispersing vessel can be optionally chosen.

Etching Treatment:

Next, the step of a surface treatment by etching will be described.

The phosphor relating to the invention has not a function of enhancing luminescence intensity by convex portions on the surface, so that it is preferred to subject phosphor particles having less or no convex portions on their surface to an etching treatment from the viewpoint of more closely packing phosphor particles into the phosphor layer and subjecting the phosphor surface to a more uniform etching treatment.

It is feasible to make an appropriate choice according to impurities on the phosphor particle surface; for instance, a physical method of abrading the surface with microparticles or by ion-spattering may be applicable but a chemical method in such a manner that phosphor particles are immersed in an etching solution to dissolve impurities on the surface is more effective. However, erosion of the surface of the phosphor particle body results in reduced luminescence intensity so that etching needs to be carefully carried out.

An etching solution, the kind of which is decided based on the present impurities, may be acidic or basic, and may be an aqueous solution or an organic solvent solution. The use of an acidic aqueous solution results in markedly effects so that the use of a strongly acidic aqueous solution is specifically preferred. Strong acids such as hydrochloric acid, nitric acid, sulfuric acid, phosphoric acid and perchloric acid are usable but hydrochloric acid, nitric acid or sulfuric acid is preferred and hydrochloric acid is specifically preferred.

After completion of etching, a washing treatment is preferably conducted to remove any residual etching solution.

Molecular-Labeling Substance

The nanosized phosphor of the invention is usable as a molecular-labeling phosphor with being adsorbed or bonded to a molecular-labeling substance. Molecular-labeling substances which are specifically-reactive with a targeted substance are not limited and include, for example, proteins such as an antigen and an antibody, DNA, and cyclic compounds such as cyclodextrin and a crown ether.

EXAMPLES

Hereinafter, the present invention will be concretely described with reference to examples but the embodiments of the invention are by no means limited to these.

Examples

Synthesis of Green Phosphor Through Liquid Phase Method

Composition: $Zn_2SiO_4:Mn^{2+}$

A colloidal silica containing 45 g of silicon dioxide (produced by Fuso Kagaku Kogyo Co., Ltd.) and 180 g of potassium hydroxide were mixed with pure water to make 1500 ml to obtain solution A. 402 g of zinc nitrate hexahydrate (produced by Kanto Kagaku Co., Ltd. at a purity of 99.0%) and 34 g of manganese nitrate hexahydrate were dissolved in pure water to make 1500 ml to obtain a solution B.

The solutions A and B were each maintained at 50° C. and then supplied to a Y-shaped reactor by using a roller pump P and a mixer M, as shown in FIG. 1, at an addition rate so that the Reynolds number at the mixing site was 500,000.

The reaction solution obtained by the reaction was ripened with being maintained at 50° C. and then circulated at a circulation rate of 30 l/min with allowing the reaction solution to pass through separation membrane Romicon-HF2-20-PM20 (Molecular Weight Cut Off: 10,000) to perform desalting until the reaction solution reached a conductivity of 2 mS/m, while adding pure water so that the reaction solution was maintained at a constant volume. Then, the reaction solution was placed into a vessel and ultrasonic was applied thereto to form foggy droplets, which were introduced along with nitrogen gas as a carrier gas to a furnace heated at 100° C. and subjected to calcination to obtain a green-luminescent phosphor 1.

Green phosphors 2-5 were prepared in the same manner as the foregoing, except that the reaction solution obtained in the foregoing reaction, and a mixture obtained by mixing a colloidal silica (silicon dioxide) and potassium hydroxide at amounts shown in Table 1 with pure water to make 3000 ml were each supplied to the Y-shaped reactor shown in FIG. 1 at an addition rate so that the Reynolds number at the mixing site was 500,000.

The particle size, σ/r and electrostatic charge amount of phosphors 1-5 are shown in Table 1.

The particle size and σ/r were determined in such a manner that the particles were photographed by a transmission electron microscope (produced by Nippon Denshi Co., 2000FX type) at 5000-fold magnification, then, the obtained negative image was read by a scanner and at least random 300 particles were measured by using an appropriate processing software to determine an average particle size and a standard deviation.

The electrostatic charge amount was determined by a blow off measurement. In this evaluation means, a dispersion of a carrier with an electrostatically attached phosphor was placed into a metal vessel which partially put up a metallic mesh partially having openings of a diameter capable of allowing only phosphor particles to pass, and a gas such as dry air was sprayed thereto to blow off only the phosphor outside of the vessel. Thereby, an electric charge having a charge amount identical to that of the phosphor but with an inverse polarity was detected for the entire vessel. There was employed, as the carrier, DEF-360, produced by Dowa Teppun Kogyo Co., Ltd.

Evaluation of the phosphors is described below.

Obtained phosphors 1-5 were each suspended in water and after adding protein A thereto, centrifugal sedimentation was conducted to form a composite of protein A-phosphor. Subsequently, the protein A-phosphor composite was bonded to an antibody to form a molecular-labeling phosphor. After an antigen-antibody reaction was performed between the molecular-labeling phosphor and a specimen having an antigen, exposure to vacuum ultraviolet rays was conducted in a vacuum vessel at 0.1-1.5 Pa using an excimer 146 nm lamp (produced by Ushio Denki Co.) and the obtained green light was measured by a detector (MCPD-3000, produced by Otsuka Denshi Co., Ltd.) to calculate the relative emission luminance as a relative value, based on the emission luminance of molecular-labeling phosphor 1 being 100, as shown in Table 1.

Further, ultraviolet exposure was repeated and after repeating 50 times of such exposure, the relative emission luminance was determined.

TABLE 1

| Phosphor No. | Silicon Dioxide | Potassium Hydroxide | Particle Size (*) | σ/r | Electrostatic Charge (μC/g) | Luminance (**) | Remark |
|---|---|---|---|---|---|---|---|
| 1 | — | — | 70 nm | 0.32 | 10 | 100/60 | Comp. |
| 2 | 10 g | 40 g | 70 nm | 0.32 | 3 | 200/190 | Inv. |
| 3 | 20 g | 80 g | 70 nm | 0.32 | −5 | 180/150 | Inv. |
| 4 | 40 g | 160 g | 70 nm | 0.32 | −15 | 150/140 | Inv. |
| 5 | 80 g | 320 g | 70 nm | 0.32 | −25 | 80/40 | Comp. |

(*) maximum particle size of 90% of total particles
(**) emission luminance at first exposure/emission luminance after 50 exposures As apparent from Table 1, it is shown that phosphors of the invention, which have an electrostatic charge of −20 μC/g to 5 μC/g, exhibit a high emission luminance as a molecular-labeling phosphor and enhanced stability.

What is claimed is:

1. A nanosized phosphor, wherein at least 90% of total particles have a particle size of 1 to 100 nm and an electrostatic charge amount of the total particles is from −20 μC/g to 5 μC/g.

2. The nanosized phosphor as claimed in claim 1, wherein σ/r is from 0.05 to 0.5 in which r is an average particle size of the nanosized phosphor and σ is a standard deviation of particle size distribution of the nanosized phosphor.

3. The nanosized phosphor as claimed in claim 1, wherein the electrostatic charge amount of the total particles is from −10 μC/g to 5 μC/g.

4. The nanosized phosphor as claimed in claim 1, wherein the total particles have a particle size of not more than 80 nm.

5. The nanosized phosphor as claimed in claim 2, wherein σ/r is not more than 0.4.

* * * * *